Dec. 13, 1955 G. E. GREGORY, JR 2,727,123
STUD WELDER

Filed Aug. 18, 1952 4 Sheets-Sheet 1

INVENTOR.
GEORGE E. GREGORY JR.
BY
Barnes, Kisselle, Laughlin & Raisch
ATTORNEYS Dec. 13, 1955 G. E. GREGORY, JR 2,727,123
STUD WELDER
Filed Aug. 18, 1952 4 Sheets-Sheet 2
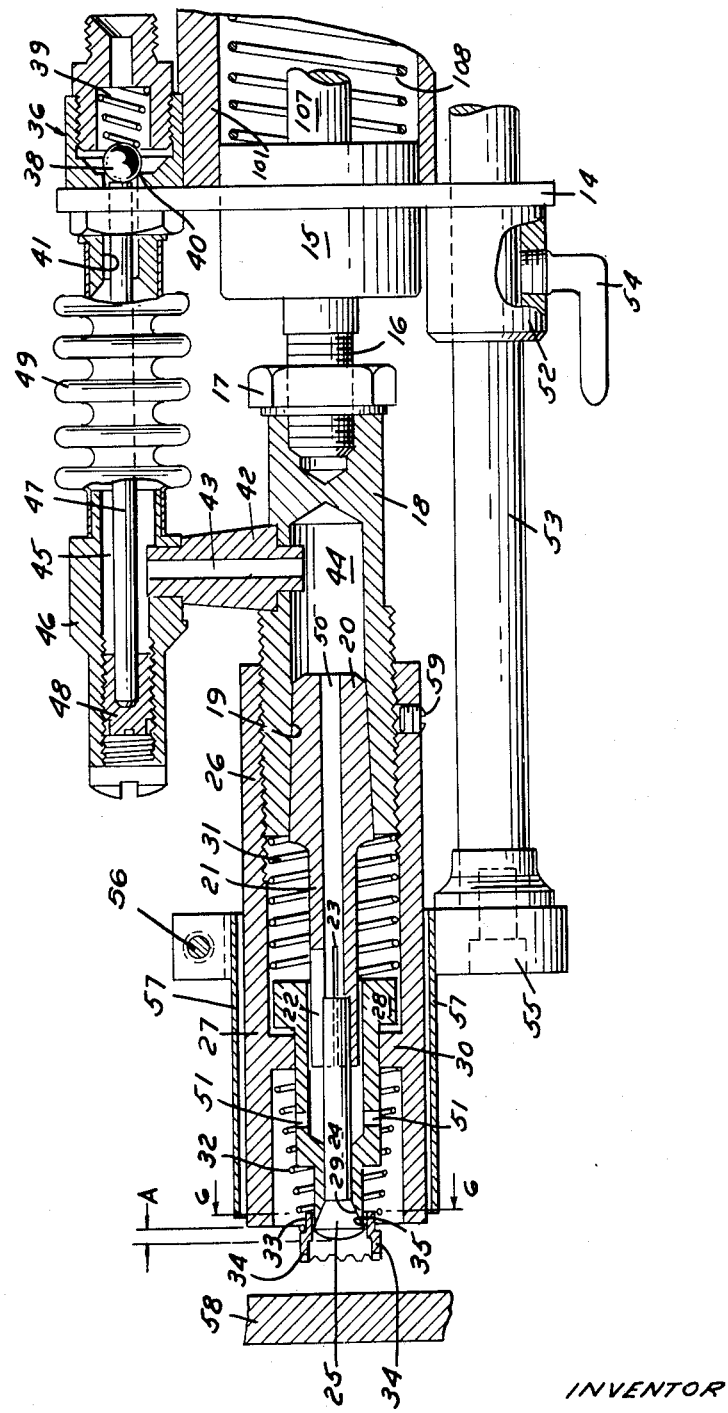
INVENTOR
GEORGE E. GREGORY JR.
BY
ATTORNEYS

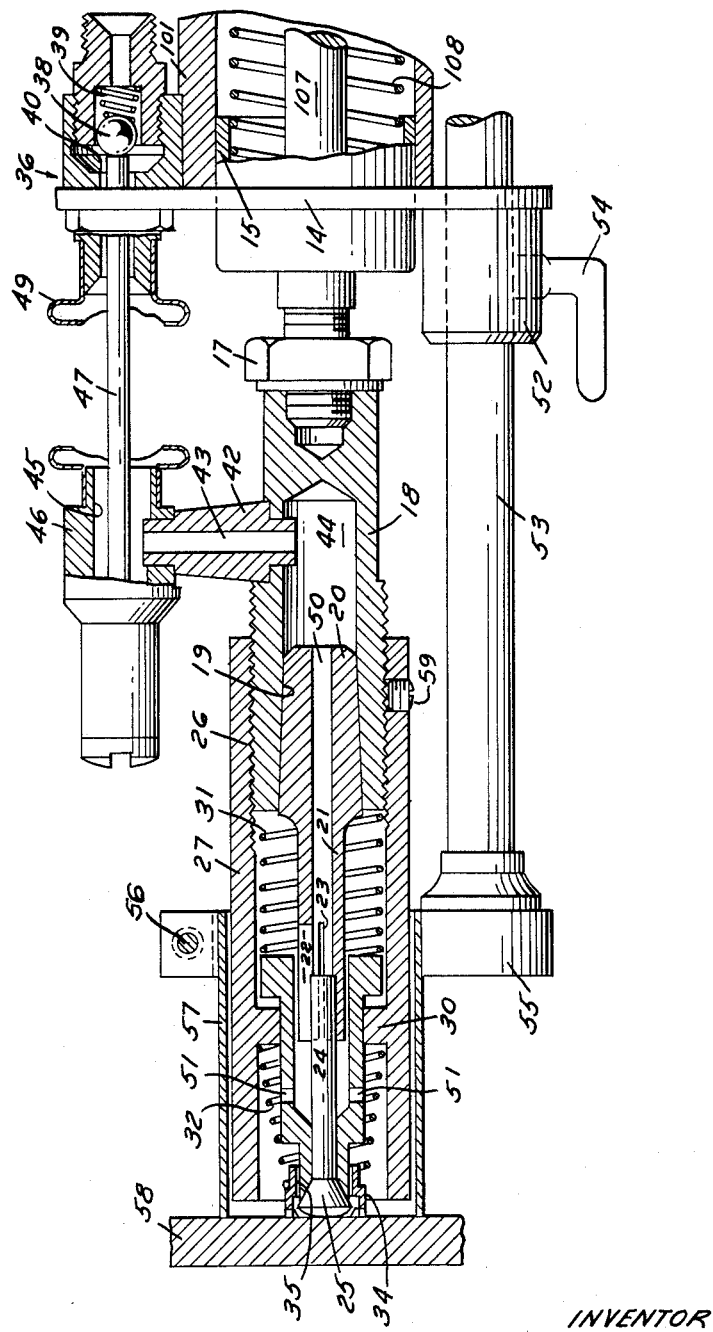

Dec. 13, 1955   G. E. GREGORY, JR   2,727,123
STUD WELDER

Filed Aug. 18, 1952   4 Sheets-Sheet 4

INVENTOR.
GEORGE E. GREGORY JR.
BY
Barnes, Kisselle, Laughlin & Raisch
ATTORNEYS United States Patent Office 2,727,123
Patented Dec. 13, 1955

2,727,123
STUD WELDER

George E. Gregory, Jr., Bay Village, Ohio, assignor to Gregory Industries, Inc., Detroit, Mich., a corporation of Michigan Application August 18, 1952, Serial No. 304,991

29 Claims. (Cl. 219—4)

This invention relates to the art of arc welding studs, particularly aluminum alloy studs, and has particularly to do with an improved stud welding gun.

In arc welding aluminum studs to a backing member such as an aluminum plate, it has been found that it is practically essential to blanket the end of the stud and the surrounding portions of the plate with an atmosphere of inert gas such as helium or argon in order to prevent oxide formation and the resultant production of porous and weak welds.

In welding such studs to a plate the customary practice is to surround the end of the stud with a ceramic ferrule which forms a dam for the weld metal and confines the weld metal to the desired area. It has heretofore been proposed to blanket the end of the stud with an inert gas by forcing the gas under pressure as a stream axially along the stud and into the ferrule, the gas under pressure escaping around the rim of the ferrule where it contacts the work.

I have found that, when arc welding studs, particularly aluminum studs, in an atmosphere of inert gas, the welds produced are most satisfactory when the ferrule itself is enclosed in a bath of inert gas which has no appreciable pressure behind it. When the inert gas is in the form of a bath which surrounds the end of the stud and the ferrule, as distinguished from a stream of gas under substantial pressure flowing through the ferrule, there are no pressure forces exerted by the gas on the arc which cause the arc to move around and also create an unstable arc; and at the same time, a more complete surrounding of the whole welding area with inert gas is assured.

I have also found that in connection with arc welding aluminum studs the distance through which the stud is plunged toward and into the plate on which it is being welded after the arc is broken must be capable of being critically adjusted in order to produce consistently sound welds with a good fillet formation at the base of the stud.

It is therefore an object of this invention to produce a stud welding device provided with means for surrounding the whole stud welding area with a low-pressure bath of inert gas during the welding operation.

A further object of the invention resides in the provision of a welding gun which is especially adapted for the production of consistently sound aluminum stud welds.

Another object of the invention resides in the provision of extremely accurately adjustable stop means on a stud welding gun for controlling the distance through which the stud is plunged after the arc is broken.

In the drawings:

Fig. 4 is a fragmentary sectional view similar to Fig. 3 and showing the parts in the positions they occupy when the stud-loaded gun is positioned against a plate to which the stud is to be welded.

Fig. 6 is a sectional view along the lines 6—6 in Fig. 5.

Figure 1:
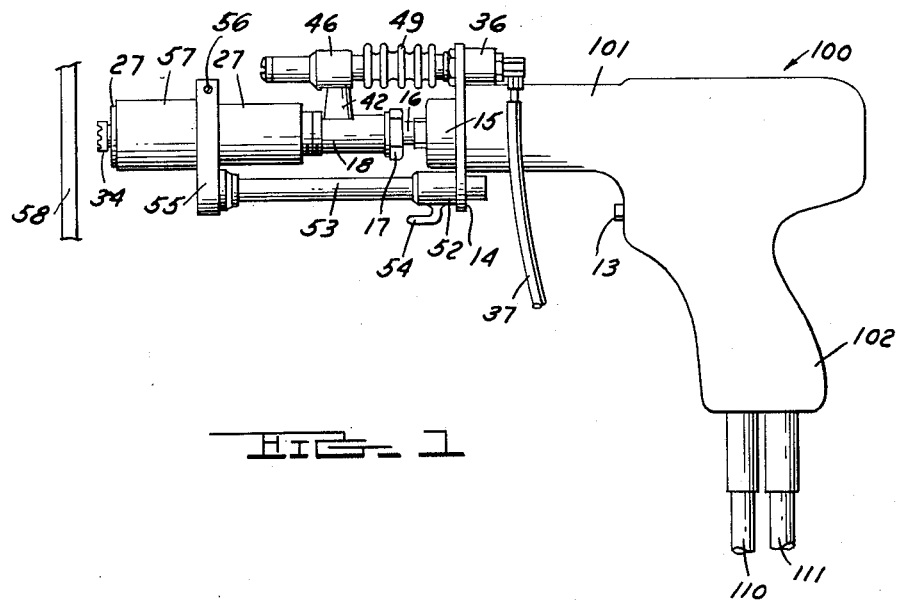
Fig. 1 is a side elevation of a stud welding gun embodying my invention.
Figure 2:
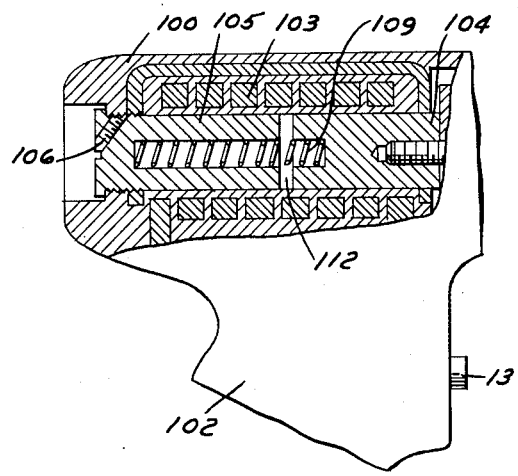
Fig. 2 is a fragmentary sectional view of the body of the gun.

Although the gun of this invention may take any of several different forms, for the purpose of illustration, it is shown and described as generally of the type disclosed in Nelson Patent No. 2,413,189 and Evans Patent No. 2,416,915.

As is shown more clearly in said Nelson Patent No. 2,413,189, the gun is formed as a housing 100 having a barrel portion 101 and a pistol-type hand grip portion 102. Within the rear portion of housing 100 there is enclosed the coils 103 of a solenoid. A core or armature 104 is slidably mounted within the solenoid formed by coils 103. The movement of armature 104 under the influence of the solenoid is determined by a fixed core 105. Core 105 is threaded into the rear end of housing 100 and a set screw 106 is provided for locking the core in place.

At the outer end of barrel 101 there is attached a plate 14 which slidably and non-rotatably supports a bearing or collar 15 which is slidably arranged within barrel 101. Bearing 15 has connected thereto a lift rod 107, and lift rod 107 is in turn connected by a clutch mechanism (not shown) with the end of armature 104. A spring 108 biases bearing 15 in a direction outwardly of barrel 101, and a spring 109 acts between fixed core 105 and armature 104.

Current is supplied to the gun through conductors 110 and 111, and the energization of the gun is controlled by a trigger switch 13. When switch 13 is actuated, coils 103 are energized to retract armature 104 towards the fixed core 105 through the clearance space 112. The circuit, of which conductors 110 and 111 form a part, includes a welding current generator and a timer (not shown) which are described and illustrated together with the rest of the electrical circuit of the gun in said Nelson Patent No. 2,413,189.

Bearing 15 has a reduced end portion 16 on which is threaded a lock nut 17 and a chuck adapter 18 in the form of a sleeve having a tapered socket 19 adapted to receive a correspondingly tapered shank portion 20 at one end of a chuck member 21. The other end of chuck 21 is fashioned with a cylindrical socket 22 the side walls of which are slotted longitudinally as at 23. Socket 22 is arranged to frictionally receive the shank of a stud 24. In the case of aluminum, the welding end of stud 24 is preferably fashioned as an enlarged bulb 25. The construction thus far described is substantially the same as that shown in said Nelson Patent No. 2,413,189.

The outer end of chuck adapter 18 is externally threaded as at 26 to receive a generally cylindrical tube or shield 27 which is preferably formed of a non-conducting material such as formica. Within tube 27 there is slidably arranged a back-up sleeve 28 which surrounds and has a clearance with the shank of chuck 21. At its outer end sleeve 28 is formed with a tapered or concave seat 29 which conforms in shape with the rear annular face of the bulb 25 of stud 24. Back-up sleeve 28 is limited in its movement outwardly of tube 27 by an internal shoulder 30 on tube 27 and is biased by a compression spring 31 in a direction outwardly of tube 27 to position the seat 29 against the bulb of stud 24.

In the outer end of tube 27 there is arranged a conically-shaped helical spring 32. The end coils at the larger end of spring 32 are frictionally engaged within tube 27 in abutting relation with shoulder 30, and the smaller end coils at the other end of spring 32 frictionally receive the collar portion 33 of a ceramic ferrule 34. Ferrule 34 is of the vented type shown and described in Nelson Patent No. 2,416,204. Ferrule 34 has a bore 35 only slightly greater than the external diameter of the outer end portion of back-up sleeve 28 so that the sleeve has a sliding fit in ferrule 34.

For the purpose of directing inert gas to the welding end of the stud, there is secured on plate 14 a valve 36 which connects with a source of inert gas by means of a flexible conduit 37. Valve 36 includes a ball 38 which is biased by a spring 39 into sealing engagement with a seat 40 for controlling the passage 41 through the valve. A fitting 42 on chuck adapter 18 has a passage 43 therein which communicates with the central bore 44 of adapter 18 and with a chamber 45 within a plunger body 46. Fitting 42 connects plunger body 46 with adapter 18 so that the body 46 and adapter 18 move together as a unit. Within body 46 there is arranged a plunger 47 having one end engaged with an adjusting screw 48. The opposite end of plunger 47 extends through valve 36 and is arranged to engage ball 38 and open passage 41 when the plunger body 46 moves sufficiently in a direction towards valve 36. A flexible or collapsible bellows element 49 extends between valve 36 and plunger body 46.

It will be noted that chuck 21 is provided with a central passage 50 and that the slots 23 in chuck 21 extend axially inwardly of chuck 21 beyond the inner end of stud socket 22 so that gas is permitted to flow from chamber 44 through passage 50 and then radially outwardly through slots 23 and into the bore portion of sleeve 28 which surrounds the shank of stud 24. Sleeve 28 is provided with a plurality of circumferentially spaced apertures 51 so that gas flowing therethrough is permitted to flow radially outwardly through these apertures 51 into the outer end portion of tube 27 around ferrule 34.

There is also secured to plate 14 a bushing 52 which slidably receives a leg 53. Leg 53 is parallel to the axis of movement of bearing 15 and is arranged to be locked in a desired position of longitudinal adjustment in bushing 52 by means of an L-shaped locking screw 54. At its outer end leg 53 has secured thereto a split foot 55 on which is supported an outer tube 57 which surrounds and is coaxial with tube 27. A tightening screw 56 is provided for clamping foot 55 around tube 27.

Figure 3:
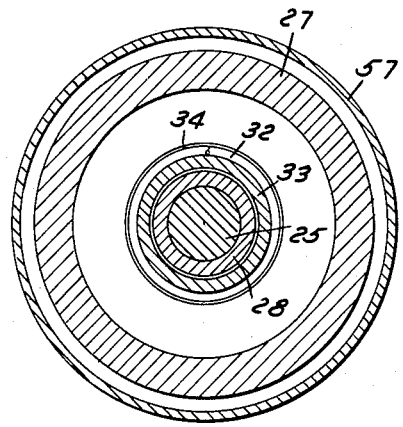
Fig. 3 is a fragmentary sectional view on an enlarged scale of the gun shown in Fig. 1 and showing a stud inserted in the chuck of the gun.

When it is desired to weld the aluminum stud 24 to a backing member such as the plate 58 (Figs. 3 and 4), a ferrule 34 is engaged with spring 32 and the stud is inserted into the socket 22 of chuck 21. As the stud is pushed inwardly to seat in the socket of the chuck, the rear annular face of the bulb 25 at the end of stud 24 engages the seat 29 of sleeve 28 and shifts the sleeve 28 axially inwardly of the end of the gun against the tension of spring 31. Spring 31 therefore urges the outer end of sleeve 28 into engagement with the bulb 25 of stud 24 at all times; but, of course, spring 31 is not sufficiently strong to cause sleeve 28 to pull the stud 24 out of socket 22. With the stud seated within the chuck 21, inner tube 27 is threadedly adjusted on adapter 18 so that the extreme end of the stud projects outwardly beyond the corresponding end of tube 27 a distance A corresponding to the distance it is desired to have the stud plunge into the plate 58 after the arc is broken. The distance A is controlled to produce the desired size of fillet around the base of the stud. The concave seat 29 at the end of back-up sleeve 28 prevents weld spatter or the fillet formed from adhering to the rear surface of bulb 25.

It will be appreciated that the threaded connection between tube 27 and adapter 18 enables a very accurate adjustment of the extent of plunge of the stud. After tube 27 is adjusted to the desired position, it is securely locked in place by a set screw 59. Leg 53 is thereafter adjusted so that the outer end of tube 57 is spaced axially inwardly a short distance of the outer end of inner tube 27. Conditioning of the gun for welding is completed by adjusting valve plunger 47 so that gas is permitted to flow through passage 44 as soon as the bulb end of the stud 24 is positioned against plate 58 and the gun is pushed towards the plate to a position wherein the plate contacts the outer end of tube 57. The stud, together with the chuck 21 and adapter 18, moves in a direction inwardly of, that is, towards the handle of, the gun.

It will be observed that, when the end of the gun is positioned against plate 58 with the outer end of tube 57 against the plate as shown in Fig. 4, the entire chuck assembly moves inwardly of outer tube 57 as a unit thus compressing spring 32 so that the ferrule 34 surrounds the bulb end 25 of stud 24 while the ferrule and stud are in contact with plate 58. In this position, it will be noted, the end of inner tube 27 is spaced slightly from plate 58. Inward movement of the chuck assembly which includes stud 24, chuck 21, adapter 18, body 46, tube 27 and bearing 15 causes rod 47 to unseat ball 38 and thereby permit gas to flow through valve 36. The gas flow is from chamber 45 through passage 43, into chamber 44 through passage 50, outwardly through slots 23, then radially outwardly through openings 51 in sleeve 28. The gas is thereby caused to flow around ferrule 34 and then outwardly between plate 58 and the end of inner tube 27 which is spaced therefrom. Outer tube 57 seats against plate 58 but does not form a seal therewith. The pressure of the gas within flexible conduit 37 is relatively low, only sufficient to produce a flow of gas into shield 27. I have found that satisfactory results are produced when the flow is as low as twenty-six cubic feet per hour. The inert gas can escape through the space between inner tube 27 and outer tube 57 and/or between outer tube 57 and plate 58. The low pressure and flow of gas along with these means of escape prevents turbulence and helps to insure a non-turbulent bathing of the weld zone with inert gas.

Figure 5:
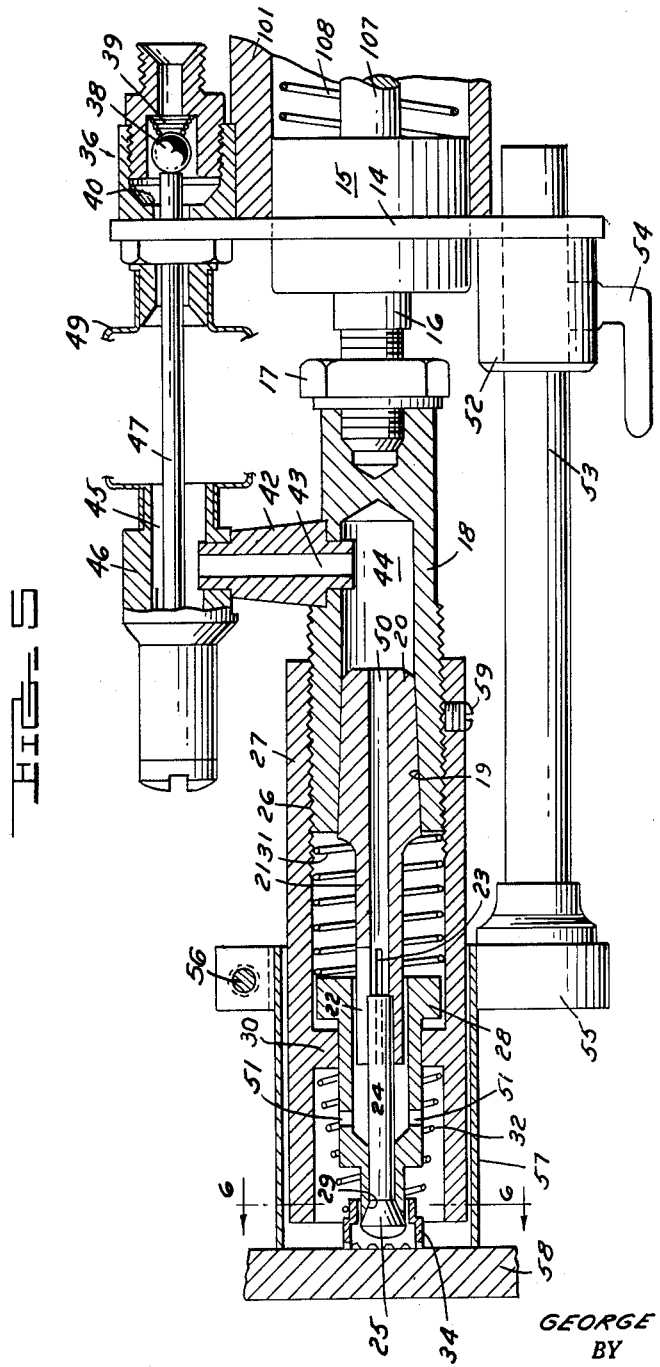
Fig. 5 is a view similar to Fig. 4 and showing the parts in the positions they occupy when the gun is actuated to retract the stud and draw an arc between the end of the stud and the plate.

When trigger 13 is actuated, a circuit is closed through the solenoid coils 103, and a welding current flows through stud 24 and plate 58. Closing of the circuit through the solenoid causes the armature 104 with which the bearing member 15 is operatively connected to be retracted toward the stationary core 105 to thereby draw an arc between the end of stud 24 and plate 58 (Fig. 5). After a predetermined time interval the circuit through the solenoid is broken by the timer (not shown) and the chuck assembly is driven in an outwardly direction under the influence of spring 108 to thereby cause the bulb end 25 of stud 24 to be plunged into the surrounding molten portion of plate 58. The end of tube 27 forms a stop which determines the extent to which the stud is plunged into plate 58.

It will be observed that sleeve 28 is biased constantly into engagement with the rear annular face of the bulb end 25 of stud 24. Thus, when the arc is drawn, sleeve 28 eliminates flashback and spattering of weld metal along the shank of the stud. When the stud is plunged into plate 58, the tapered seat portion 29 of sleeve 28 acts as a plunger in the neck of the ferrule and cooperates therewith to form an even fillet entirely around the base of the stud. The outer tube 57, in addition to its function of holding the gun in position relative to the plate whereby the stud can lift and plunge, also serves as a spark confining shield and as a shield to prevent external air currents or wind from blowing the inert gas away from the weld zone. The use of the back-up sleeve 28 and the use of studs having bulb ends are preferred for the production of sound welds with good fillet formations.

It will be noted that the construction of the chuck assembly is such that in operation the ferrule 34 is at all times surrounded by a bath of inert gas. This is true even if the sleeve 28 is omitted from the assembly. In either event, the provision of a very low pressure bath of inert gas, as distinguished from a stream of inert gas under substantial pressure, is desirable because the gas is permitted to flow freely in and around the ferrule. There is, however, no substantial flow of gas in the immediate vicinity of the arc, and there is therefore no tendency for the arc to move around as is the case when gas under pressure is directed axially along the stud to the immediate vicinity of the arc. It is believed that little or no gas actually flows into ferrule 34 during the welding operation for, as soon as the arc is drawn, the temperature within the ferrule rises substantially, thus expanding and expelling the air-gas atmosphere from within the ferrule. The expelled gas can exit freely and without turbulence. The arrangement is therefore such that the stud is simply surrounded by a bath of inert gas, and the absence of a stream of gas through the ferrule results in a steady arc which produces consistently strong welds.

I claim:

1. A stud welding machine comprising a body, a chuck on said body, means for supporting a welding stud at the end of said chuck, means for supporting a ferrule in a position surrounding the welding end of a stud in said chuck, a tubular shield surrounding said chuck and extending to adjacent said supporting end thereof, said shield being spaced radially from a ferrule positioned at the end of a stud in said chuck, and means for supplying an inert gas to the space between the shield and the ferrule surrounding the end of the stud.

2. A stud welding machine comprising a body, a chuck on said body, means for supporting a welding stud at the end of said chuck, means for supporting a ferrule in a position surrounding the welding end of a stud in said chuck, an axially extending tubular shield surrounding said chuck and said ferrule and spaced radially therefrom, means defining a gas passage discharging into said tubular shield, and means for supplying an inert gas to said passage.

3. A stud welding machine comprising a body, a chuck on said body, means for supporting a welding stud at the end of said chuck, a ferrule supported in a position to surround the welding end of a stud in said chuck, a tubular shield surrounding said chuck and ferrule and extending axially of the chuck to adjacent the stud-supporting end thereof, said shield being spaced radially from said chuck to provide an annular space therebetween, and means for supplying an inert gas to said annular space between said shield and ferrule.

4. The combination set forth in claim 3 wherein said last mentioned means includes a passage which extends in part axially through said chuck, said chuck having openings therein for directing the gas outwardly of the chuck and into the portion of said tubular shield surrounding said ferrule.

5. The combination set forth in claim 3 wherein said shield terminates at its outer end in a plane spaced axially inwardly of the welding end of a stud engaged in said chuck whereby, when the stud-loaded machine is positioned against a backing to which the stud is to be welded and pushed against the backing to contact the end of the stud with said backing, the end of said shield is spaced from the plane of said backing.

6. The combination set forth in claim 5 including adjustable means fixedly carried by said body and settable against the backing to position the body at the desired definite distance from the backing, said adjustable means terminating at its operative end in a plane spaced axially inwardly of the welding end of a stud in said chuck.

7. A stud welding machine comprising a body, an axially movable chuck slidably supported on said body, said chuck being adapted to support a welding stud at the end thereof, a tubular shield surrounding said chuck and movable as a unit therewith relative to said body, means forming a gas passage discharging into said tubular shield, valve means for controlling the flow of gas through said passage, and means responsive to the movement of said chuck relative to said body for opening and closing said valve means.

8. A stud welding machine comprising a body, an axially movable chuck slidably supported on said body, said chuck being adapted to support a welding stud at the end thereof, a tubular shield surrounding said chuck and movable as a unit therewith relative to said body, means forming a gas passage discharging into said tubular shield, and valve means for controlling the flow of gas through said passage, said valve means including a first member movable with said chuck and shield and a second member supported by said body and movable relative to said first member, said first and second members being engageable in response to movement of said chuck and shield relative to said body to open said valve means.

9. The combination set forth in claim 8 wherein said passage is defined in part by a flexible conduit extending between said body and chuck.

10. A stud welding machine comprising a body, an axially movable chuck on said body, means for supporting a welding stud at the end of said chuck, means for supporting a ferrule in a position surrounding the welding end of a stud in said chuck, and a tubular shield surrounding and movable with said chuck, said shield extending to adjacent the stud supporting end of said chuck and being adjustable in a direction axially of said chuck to control the distance between the welding end of a stud in said chuck and the end of said shield.

11. The combination set forth in claim 10 wherein said shield is threaded on said chuck.

12. A stud welding machine comprising a body, an axially slidable chuck mounted on said body and adapted to support a welding stud at the end thereof, a shield surrounding said chuck and mounted on said chuck for adjustment in a direction axially of said chuck, said shield being adjustable to a position wherein an end thereof is disposed in a plane spaced slightly inwardly of the end of a stud in said chuck whereby, when the machine is positioned against a backing member to which a stud is to be welded and the chuck is retracted to draw an arc between the end of the stud and the backing member and thereafter released to move said stud towards said backing member, said end of said shield provides a stop for limiting the extent to which the end of the stud is plunged into said backing member.

13. The combination set forth in claim 12 wherein said shield is adapted for threaded adjustment on said chuck.

14. A stud welding machine comprising a body, an axially movable chuck mounted on said body, said chuck being adapted to hold a stud of the type having a shank and an enlarged head at the welding end thereof and a sleeve on said body movable axially relative to said chuck, said sleeve having a portion adapted to surround the shank of a stud engaged in said chuck and having an end portion adapted to abut against the enlarged head of a stud engaged in said chuck.

15. A stud welding machine comprising a body, an axially movable chuck slidably mounted on said body, said chuck being adapted to hold a welding stud at the end thereof, a tubular member surrounding said chuck and spaced radially from the stud-holding end thereof, a sleeve slidably arranged between said chuck and said tubular member, said sleeve extending outwardly beyond the end of said chuck and adapted to surround the shank of a stud engaged in said chuck.

16. The combination set forth in claim 15 including means biasing said sleeve axially in a direction outwardly beyond the end of the chuck.

17. The combination set forth in claim 15 including a ferrule slidably arranged on the outer end of said sleeve and adapted to surround the welding end of a stud engaged in said chuck.

18. A stud welding machine comprising a body, an axially movable chuck on said body, said chuck being adapted to hold at the end thereof a welding stud having an enlarged head at the welding end thereof, and a sleeve telescoped over said chuck and extending axially beyond the chuck to abut against the enlarged head at the end of the stud.

19. The combination set forth in claim 18 wherein the outer end of the sleeve is provided with a seat which corresponds in shape with the rear face of said head at the end of the stud.

20. The combination set forth in claim 19 including means biasing said sleeve axially into engagement with said head at the end of said stud.

21. A stud welding device comprising, a body abuttable against a work piece, a chuck mounted on the body for movement relative thereto to support a stud having an end weldable to the work piece, a shield forming a gas chamber at the end of the stud, and means directing gas into said shield, said means including a valve responsive to movement of said chuck relative to said body.

22. A stud welding device comprising, a ferrule to receive the welding end of a stud, a chuck aligned with the ferrule and movable relative thereto to support a welding stud, a shield forming a gas chamber at said ferrule, and means including a valve responsive to movement of said chuck relative to said ferrule for directing gas into said shield.

23. The combination of claim 22, wherein said shield surrounds said ferrule to form the gas chamber around the ferrule.

24. The combination set forth in claim 14 including means biasing said sleeve axially outwardly in a direction towards the welding end of a stud held in said chuck.

25. The combination set forth in claim 14 wherein the outer end of said sleeve is formed with a concave seat to receive the enlarged head of a stud held in said chuck.

26. The combination set forth in claim 14 including a ferrule slidably supported on said sleeve at said end portion thereof and adapted to surround the welding end of a stud held in said chuck.

27. A welding machine comprising a tubular member having an end seatable against a work piece and defining a gas chamber, an electrode holder in said member and movable therein in a direction towards and away from said end of the tubular member, means including a valve for directing gas into said member in a direction towards said end thereof and means responsive to movement of said electrode holder relative to said member and in a direction away from said end thereof for opening said valve.

28. The combination set forth in claim 27 wherein said electrode holder is movable in a direction axially of said tubular member.

29. A welding machine comprising a tubular member having an end seatable against a work piece, an electrode holder in said member and movable therein in a direction towards and away from said end of the tubular member, said tubular member defining an enclosure around an electrode in said holder, means including a valve for directing gas into said enclosure in a direction towards the welding end of an electrode in said holder and means responsive to movement of said electrode holder relative to said tubular member and in a direction away from said end thereof for opening said valve.

References Cited in the file of this patent

UNITED STATES PATENTS

| | | |
|---|---|---|
| 2,110,832 | Hogg et al. | Mar. 8, 1938 |
| 2,231,480 | Pilger | Feb. 11, 1941 |
| 2,315,502 | Crecca et al. | Apr. 6, 1943 |
| 2,413,189 | Nelson | Dec. 24, 1946 |
| 2,491,479 | Dash | Dec. 20, 1949 |
| 2,566,318 | Dalin et al. | Sept. 4, 1951 |